(12) United States Patent
Frank et al.

(10) Patent No.: US 7,240,496 B2
(45) Date of Patent: Jul. 10, 2007

(54) SUPERCONDUCTIVE DEVICE COMPRISING A REFRIGERATION UNIT, EQUIPPED WITH A REFRIGERATION HEAD THAT IS THERMALLY COUPLED TO A ROTATING SUPERCONDUCTIVE WINDING

(75) Inventors: Michael Frank, Uttenreuth (DE); Wolfgang Nick, Nürnberg (DE); Peter van Hasselt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 304 days.

(21) Appl. No.: 10/514,859

(22) PCT Filed: Mar. 31, 2003

(86) PCT No.: PCT/DE03/01052

§ 371 (c)(1),
(2), (4) Date: Nov. 15, 2004

(87) PCT Pub. No.: WO03/098786

PCT Pub. Date: Nov. 27, 2003

(65) Prior Publication Data
US 2005/0155356 A1    Jul. 21, 2005

(30) Foreign Application Priority Data
May 15, 2002 (DE) ................ 102 21 635

(51) Int. Cl.
F25B 19/00 (2006.01)
F25B 9/00 (2006.01)
F28D 15/00 (2006.01)

(52) U.S. Cl. ............... 62/51.1; 62/6; 165/104.21
(58) Field of Classification Search ........... 62/51.1, 62/6; 165/104.21
See application file for complete search history.

(56) References Cited

U.S. PATENT DOCUMENTS

| | | | | |
|---|---|---|---|---|
| 3,845,628 | A | * | 11/1974 | Bronicki et al. ............ 60/656 |
| 4,771,824 | A | * | 9/1988 | Rojey et al. ........... 165/104.13 |
| 5,193,349 | A | * | 3/1993 | Laverman et al. ............ 62/64 |
| 5,385,010 | A | | 1/1995 | Horn |
| 5,482,919 | A | | 1/1996 | Joshi |
| 5,848,532 | A | * | 12/1998 | Gamble et al. ............ 62/48.2 |
| 6,376,943 | B1 | * | 4/2002 | Gamble et al. ............ 310/52 |
| 7,049,717 | B2 | * | 5/2006 | Frank et al. ............ 310/61 |
| 2006/0048522 | A1 | * | 3/2006 | Yamada ................... 62/6 |
| 2006/0158059 | A1 | * | 7/2006 | Steinmeyer et al. ....... 310/261 |

FOREIGN PATENT DOCUMENTS

| | | |
|---|---|---|
| DE | 100 39 964 A1 | 3/2002 |
| JP | 07127981 | 5/1995 |
| WO | WO 00/13296 | 3/2000 |

OTHER PUBLICATIONS

Haruyama, T; Mitsui ,T.; and Yamafuji, K. (Editors), "Proceedings of the Sixteenth International Cryogenic Engineering Conference—Part 1", International Cryogenic Materials Conference—Kitakyushu, Japan, May 20-24, 1996, pp. 33-44 and pp. 1109-1132, BPC Wheatons Ltd. Exeter, Great Britain.

* cited by examiner

Primary Examiner—William C. Doerrier

(57) ABSTRACT

The invention relates to a superconductive device containing a rotor that can be rotated about an axis of rotation and that comprises a superconductive winding in a winding support. Said winding support has a central cavity, into which two fixed thermal tubes project axially. One of said tubes forms a cooling finger that is closed at the end and contains a second coolant with a higher condensation temperature. The other tube supplies a first cooling with a lower condensation temperature to the central cavity and evacuates said coolant from the cavity. To condense the coolants, the tubes lead to a refrigeration unit, situated outside the rotor and equipped with a refrigeration head and a condenser device.

17 Claims, 3 Drawing Sheets

SUPERCONDUCTIVE DEVICE COMPRISING A REFRIGERATION UNIT, EQUIPPED WITH A REFRIGERATION HEAD THAT IS THERMALLY COUPLED TO A ROTATING SUPERCONDUCTIVE WINDING

CROSS REFERENCE TO RELATED APPLICATION

This application is the US National Stage of International Application No. PCT/DE03/01052, filed Mar. 31, 2003 and claims the benefit thereof. The International Application claims the benefits of German Patent application No. 10221635.5 DE filed May 15, 2002, both of the applications are incorporated by reference herein in their entirety.

FIELD OF THE INVENTION

The invention relates to a superconductive device with a rotor which is mounted so that it can be rotated about an axis of rotation and which displays at least one superconductive winding, the conductors of which are arranged in a winding support, and with a refrigeration unit which displays at least one refrigeration head that is thermally coupled to the winding. A corresponding device is disclosed by U.S. Pat. No. 5,482,919 A.

BACKGROUND OF THE INVENTION

In addition to the long familiar metallic superconductive materials such as NbTi or $Nb_3Sn$, which have very low transition temperatures $T_c$ and are therefore also referred to as low $T_c$ superconductive materials or LTS materials, metal oxide superconductive materials with transition temperatures of more than 77 K have been known since 1987. The latter materials are also referred to as high $T_c$ superconductive materials or HTS materials, and in principle enable a cooling technology using liquid nitrogen ($LN_2$).

The attempt is also being made to produce superconductive windings with conductors by using such HTS materials. It has been found, however, that conductors known to date only possess a relatively low current carrying capacity in magnetic fields with inductions in the tesla range. This frequently imposes the necessity that the conductors of such windings, in spite of the intrinsically high transition temperatures of the materials used, must nevertheless be kept at a temperature level which lies below 77 K, for example between 10 and 50 K, in order thus to be able to carry significant currents in the presence of field strengths of a few tesla. Such a temperature level lies substantially higher than 4.2 K, the boiling temperature of liquid helium (LHe), with which known metallic superconductive materials such as $Nb_3Sn$ or NbTi are cooled.

Refrigeration units in the form of cryocoolers with a closed He compressed gas circuit are therefore preferably used in the said temperature range for cooling windings with HTS conductors. In particular, such cryocoolers are of the Gifford-McMahon or Stirling type or are realized as so-called pulse tube coolers. Such refrigeration units additionally have the advantage that the refrigeration power is available almost at the touch of a button and the user is spared the handling of low-temperature liquids. Where such refrigeration units are used, a superconductive device such as a solenoid coil or a transformer winding is only cooled indirectly by means of thermal conduction to a refrigeration head of a refrigerator (cf. e.g. "Proc. 16th Int. Cryog. Engng. Conf. (ICEC 16)", Kitakyushu, JP, 20-24.05.1996, Elsevier Science, 1997, pages 1109 to 1129).

A corresponding cooling technique is also provided for a superconductive rotor of an electrical machine which can be taken from U.S. Pat. No. 5,482,919 A. The rotor contains a rotating winding of HTS conductors which can be kept at a desired operating temperature between 30 and 40 K by means of a refrigeration unit designed as a Stirling or Gifford-McMahon or pulse tube cooler. For this purpose, the refrigeration unit contains, in a special embodiment, a co-rotating refrigeration head which is not described further in the specification, the colder side of which is thermally coupled to the winding indirectly by way of thermally conducting elements. Furthermore, the refrigeration unit of the known machine comprises a compressor unit situated outside its rotor which supplies the required working gas to the refrigeration head by way of a rotating coupling, which is not described in detail of a corresponding transfer unit. Additionally, by way of two slip rings, the coupling also supplies a valve drive mechanism of the refrigeration unit, which is integrated into the refrigeration head, with the necessary electrical energy. This concept requires that at least two gas connections must be routed coaxially and at least two electrical slip rings provided in the transfer unit. Additionally, the accessibility of the co-rotating parts of the refrigeration unit and in particular of the valve drive mechanism in the rotor of the machine is hampered since the rotor housing must be opened in the case of maintenance being required. Furthermore, the function of a conventional valve drive mechanism is not assured in the case of rapid rotation such as is present in the case of synchronous motors or generators.

SUMMARY OF THE INVENTION

The object of the present invention is to configure the device with the features stated in the introduction, proceeding from this state of the art, in such a way that it can ensure reliable and cost-effective operation of the refrigeration unit both in the cooling phase and also in the stationary state and in the case of rotation of the rotor in a temperature range below 77 K and with a reduced equipment cost by comparison.

This object is achieved according to the invention with the measures specified in the claims. Accordingly, the superconductive device comprises a rotor which is mounted so that it can be rotated about an axis of rotation and which displays at least one superconductive winding, the conductors of which are arranged in a winding support, and also a refrigeration unit which displays at least one refrigeration head that is thermally coupled to the winding. In this respect, the superconductive device should display the following features, specifically:

that the winding support is equipped with a central cavity extending in the direction of the axis, which is connected to a lateral cavity leading laterally out of the winding support area, that the refrigeration head is situated in a fixed manner outside the rotor and is thermally connected by means of a cold surface to a condenser device for the purposes of condensing a first and at least one further coolant in separate condenser chambers, where the coolants differ in terms of their condensation temperatures, that a first fixed thermal tube for the first coolant and at least one further fixed thermal tube for at least one further coolant lead from the condenser device into the co-rotating lateral cavity and where relevant into the area of the central cavity, that the first, open-ended thermal tube, the lateral cavity and the central cavity are filled with the first coolant, where, in an operating phase of the device, by exploiting a thermosyphon effect, condensed coolant passes into the central cavity and also coolant warmed and where relevant in the process of evaporating there passes back via the first thermal tube again to its condenser chamber, and also that at least one further thermal tube is realized as a cooling finger that is closed at the end in the central cavity with a filling of at least one further coolant, where, in a cooling phase, by exploiting a thermosyphon effect, coolant condensed in the condenser chamber of the tube is warmed by evaporation in the area of the central cavity and coolant evaporated in this way passes back to the condenser chamber.

In the configuration of the superconductive device according to the invention, the entire refrigeration unit together with any of its moving parts is consequently arranged outside the rotor and therefore easily accessible at all times. The provision of the refrigeration power or the thermal transfer is effected from a fixed refrigeration head into the rotor by way of the thermal tubes which assure the transport of the respective coolant without mechanically actuated parts. In this respect, the first coolant provided for continuous operation or the operating phase is condensed by the release of heat at a condenser device, which is connected to the refrigeration head in a highly thermally conducting manner, in a circular process. The liquid condensate subsequently runs through the first thermal tube provided for this purpose into the lateral cavity of the rotor and from there into its central cavity or direct into said cavity. The transport of the condensate through the first thermal tube takes place under the influence of gravity on the basis of a so-called thermosyphon effect and where relevant by means of the capillary force of the internal wall of the thermal tube. For this purpose, this tube acts as a "wick" in the intrinsically known manner. This function can be further optimized by means of appropriate configuration or lining of the internal wall. At the end of the first thermal tube, the condensate drips or runs into the cavity provided. The condensate situated in the area of the winding is at least partially evaporated there by the absorption of heat. The first coolant then flows through the interior of the first thermal tube back into the condenser device. In this respect, the return flow is driven by a slight overpressure in the central cavity, acting as the evaporation part, relative to the parts of the condenser device acting as a condenser. This partial vacuum generated by the creation of gas in the evaporator and the liquefaction in the condenser results in the desired return flow of coolant. Corresponding coolant flows are intrinsically known from so-called "heat pipes".

At least one further thermal tube, which is filled with a gas which already condenses at higher temperatures such as nitrogen, argon or a hydrocarbon, for example, as a further coolant, represents a cooling finger which projects into the central cavity and is closed at the end there. The thermal transfer during a cooling phase is effected up to this tube end by exploiting a thermosyphon effect by means of condensation and evaporation of the further coolant. From this tube end in the area of the central cavity, thermal transfer to the parts of the rotor to be cooled is effected by means of convection. The temperature difference of a few Kelvin arising in this respect between the end of the cooling finger and the wall of the central cavity is entirely acceptable for the purposes of precooling.

In the case of the superconductive device according to the invention, therefore, two different cooling methods are combined. A first method, which represents pure thermosyphon cooling, provides a working gas as a first coolant for the purposes of cooling during the operating phase. Only in conjunction with this first method of convective cooling can further thermosyphons with other gases (i.e. with at least one further coolant), and therefore other working temperatures, be simultaneously thermally coupled to the parts of the rotor to be cooled (=further method). This enables effective and inexpensive precooling in the presence of optimum exploitation of the refrigeration power of the refrigeration head.

Further advantages of the configuration of the superconductive device according to the invention can be seen in the fact, among others, that no moving parts such as fans or pumps, for example, are required for recirculating the coolant. Additionally, the refrigeration unit can be easily adapted to the different requirements of a machine installation. In particular, thermal tubes several meters long can be provided depending on the design, with the result that, for example, a refrigeration machine can be mounted in an accessible place to facilitate its maintenance while the actual motor or generator is installed in a manner that is difficult to access. The thermal transfer or the provision of the refrigeration power is therefore particularly simple and cost-effective in the case of the configuration according to the invention.

Advantageous configurations of the superconductive device according to the invention arise from the dependent claims.

Thus, a plurality of further thermal tubes in the form of cooling fingers with fillings of further coolants, which differ in terms of their condensation temperatures, can naturally be provided. Multi-stage cooling is enabled in this way.

Furthermore, particularly simple sealing of the coolant chamber can be achieved as a result of the fact that the central cavity is closed by the winding support on one side and the lateral cavity is sealed by a sealing device with co-rotating parts on the side facing the refrigeration head. In this respect, at least one seal in the category ferrofluid seal, labyrinth seal, diaphragm gland can preferably be considered for the sealing device.

In practice, all types of refrigeration machines which display a refrigeration head which can be set to a predetermined temperature level can be provided as the refrigeration unit. Cryocoolers, particularly with a closed He compressed gas circuit, are preferably provided since they display a simple structure and are particularly suited to an indirect cooling technique as in the case of the superconductive device according to the invention. Corresponding coolers, also referred to as regenerative cryocoolers, display a regenerator or regenerative work cycle in line with the customary classification of cryocoolers (cf. e.g. the said volume of Proceedings, pages 33 to 44).

By way of particular advantage, the refrigeration head can be realized as a multistage head. Effective precooling in particular is then possible with its second, by comparison warmer, stage.

It must additionally be seen as advantageous if the winding to be cooled and therefore its superconductive material can be kept at a temperature below 77 K, and in the case of the use of HTS material preferably between 20 and 50 K, by means of the refrigeration head. In this temperature range, which can be adhered to with relatively limited cooling effort, known HTS materials in fact display a critical current density that is sufficient for customary applications. The required refrigeration power can be found without difficulty in the case of the superconductive device according to the invention. It lies in the range from a few tens of Watts at 20 K to 30 K for a synchronous machine of the size class of around 1 up to a few tens of Megawatts of mechanical power, for example.

Moreover, it must be seen as advantageous if the lateral cavity widens in the direction of the central cavity. Then in fact, centrifugal force can also possibly be exploited as a supporting factor alongside gravity for the purposes of transporting the first coolant.

Further advantageous embodiments of the superconductive device according to the invention arise from the dependent claims which are not addressed in the foregoing.

BRIEF DESCRIPTION OF THE DRAWINGS

In the following, preferred exemplary embodiments of the superconductive device in accordance with the invention are explained in further detail on the basis of the drawing. In this respect, the diagrams show the following, in a longitudinal section in schematic form in each case.

In the diagrams, corresponding parts are labeled with the same reference symbols.

DETAILED DESCRIPTION OF THE INVENTION

Figure 1:
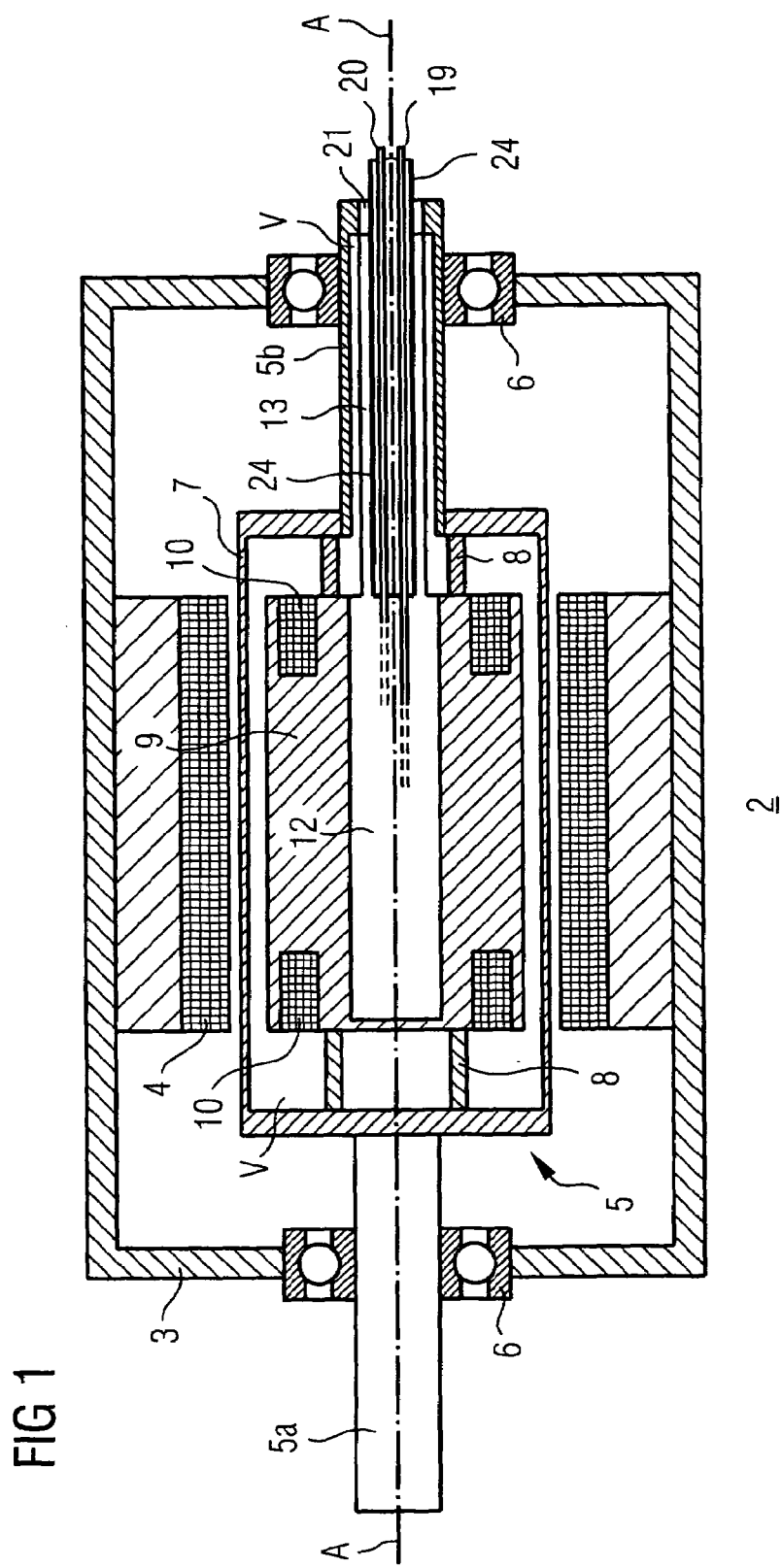
FIG. 1 an embodiment of the rotor of a superconductive device.

The embodiments of superconductive devices according to the invention highlighted on the basis of the diagrams in the following can constitute a (synchronous) motor or a (synchronous) generator in particular in each case. The superconductive device comprises a rotating superconductive winding, which in principle permits the use of metallic LTS material (low $T_c$ superconductive material) or oxidic HTS material (high $T_c$ superconductive material). $MgB_2$ can also be considered as a superconductive material. For the following exemplary embodiments, let an HTS material such as the known $(Bi,Pb)_2Sr_2Ca_2Cu_3O_x$, for example, be selected. The winding can consist of a coil or a system of coils in a 2-pole, 4-pole or other multipole arrangement. The outline structure of the parts of such a superconductive device forming a synchronous machine, for example, that are situated in the area of the rotor, can be seen in FIG. 1, which is based on known embodiments of such machines (cf. the said U.S. Pat. No. 5,482,919 A or WO 00/13296 A, for example).

The only partially shown device generally designated by 2 comprises a fixed outer housing 3 at ambient temperature with a stator winding 4. Inside the outer housing and enclosed by the stator winding 4, a rotor 5 is mounted in bearings 6 so that it can be rotated about an axis of rotation A. The bearings 6 can constitute conventional mechanical bearings or magnetic bearings. In this respect, the rotor displays a solid axial rotor shaft part 5a mounted in the corresponding bearing on one side. Furthermore, it contains a vacuum vessel 7 in which a winding support 9 with an HTS winding 10 is supported on, for example, hollow cylindrical suspension elements 8 transmitting torque. Within this winding support, a cylindrical cavity extending in the direction of the axis, which is referred to as the central cavity 12 in the following, exists concentrically to the axis of rotation A. In this respect, the winding support is implemented in a vacuum-tight manner with reference to this cavity. It closes said cavity on the side facing the rotor shaft part 5a. On the other side, the central cavity 12 is connected to an axial lateral cavity 13 with a smaller diameter by comparison, i.e. it transitions into said cavity. This lateral cavity leads outwards from the area of the winding support out of the area of the outer housing 3. A tube-shaped rotor shaft part mounted in one of the bearings 6 and enclosing this lateral cavity 13 is designated by 5b.

Figure 2:
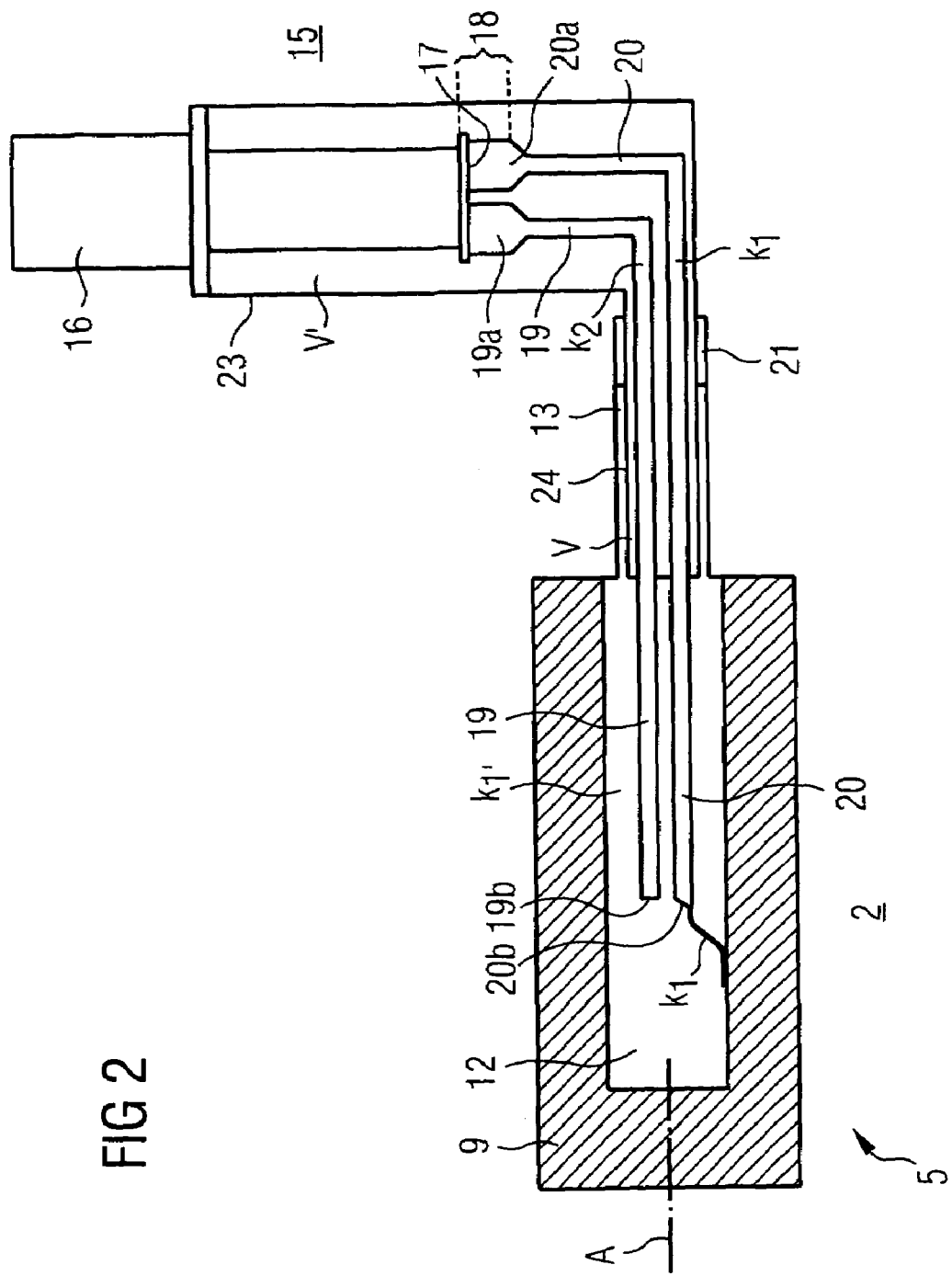
FIG. 2 a refrigeration unit for this rotor and also

The superconductive device 2 furthermore displays a refrigeration unit, which can be seen in detail in FIG. 2, for indirectly cooling its winding 10 by way of thermally conducting elements. This refrigeration unit generally designated by 15 comprises at least one refrigeration head 16. The refrigeration unit can constitute a cryocooler of the Gifford-McMahon type in particular. A pulse tube cooler or split Stirling cooler is preferably chosen as a regenerative cryocooler. In this respect, the refrigeration head 16 and therefore all essential further parts of the refrigeration unit should be situated outside the rotor 5 and the outer housing 3. Accessories required for the refrigeration unit together with refrigeration head to be used such as warm pressure equalization vessels, filling capillaries and overpressure valves for safeguarding the system against overpressure in the case of warming up, for example, are not shown in the diagram but are generally known. The refrigeration head 16 arranged 0.5 to a few meters laterally from the rotor 5, for example, projects into the vacuum V' of a vacuum vessel 23 with a thermal transfer body, for example, and displays a cold or heat exchanging surface 17 at its cold end. At least two vacuum-insulated, fixed thermal tubes 19 and 20 are thermally coupled to this cold surface. These thermal tubes widen to a larger heat exchanging cross section in the area bordering on the cold surface 17 in each case and there form widened condenser chambers 19a and 20a. The condenser chambers can thus be seen together with the cold surface 17 as a coolant condenser device or coolant condensation unit 18.

Of the thermal tubes 19 and 20, the tube 20 is referred to as a first thermal tube in the following and the tube 19 as a further thermal tube. These thermal tubes project laterally in an axial area into the lateral, co-rotating cavity 13 of the rotor. A tube 24 is provided for this purpose, being fixed and concentric with reference to the axis A, and referred to as an insertion or mounting tube in the following, which encloses the thermal tubes 19 and 20 at least into the area of the lateral cavity 13. This mounting tube can be introduced laterally into the cavity 13. For the purposes of sealing this mounting tube 24 radially with respect to the tube-shaped rotor shaft part 5b delimiting the lateral cavity 13, use is made of a sealing device 21 not shown in detail in the diagram which can be realized as a ferrofluid seal and/or a labyrinth seal and/or a diaphragm gland, for example. A vacuum V, which is connected to the vacuum V' in the vacuum vessel 23, for example, applies in the mounting tube.

By way of advantage, precooling of the parts of the rotor 5 to be cooled can be effected with the aid of the further thermal tube 19. For this purpose, this thermal tube projects as a cooling finger into the central cavity 12 where the tube is closed at one end 19b. In this respect, the tube 19 should be filled with a further coolant $k_2$ such as $N_2$, for example, which displays a second condensation temperature $T_{k2}$ which in general lies above the operating temperature of the superconductive material used for the winding 10. In a cooling phase, this further coolant $k_2$ condenses in the condenser chamber 19a of the condenser device 18 of the refrigeration unit 15. By exploiting a thermosyphon effect, it is warmed in the area of the central cavity 12 and passes back to the condenser device 18 in the thermal tube 19.

By way of the first thermal tube 20 and the lateral cavity 13, the central cavity 12 is connected to the heat exchanging area of the condenser device 18 in a manner that is sealed gas-tight to the outside. A first coolant enclosed in these chambers such as Ne, for example, is condensed by the release of heat at the cold surface 17 of the refrigeration head 16 in the area of the condenser device 18 in a circular process. The condensate liquefied in this way, designated by $k_1$ and indicated by means of a heavy line in the diagram, subsequently flows through the first thermal tube 20, initially through the area of the lateral cavity 13 and from there into the central cavity 12. In this respect, the transport of the condensate through the thermal tube takes place by means of a thermosyphon effect under the influence of gravity. For this purpose, the thermal tube 20 can be slightly inclined (by a few degrees) with respect to the axis of rotation A by way of advantage, in order thus to support the flowing of the liquid coolant $k_1$ out of the open end 20b of the tube 20. Where relevant, the coolant transport is also supported by means of a capillary force effect of the internal wall of the thermal tube, which functions as a "wick". The function of such a wick can be further optimized by means of appropriate embodiment, such as with the aid of longitudinal ribs or channels for the purposes of enlarging the surface area or by means of lining of the internal wall of the tube. The outflow of the condensate $k_1$ into the cavity 12 at the end 20b of the first thermal tube 20 can be further reinforced by means of a particular shaping of this end, for example as a drip rim. Similarly, the shaping can also be in such a form that the dripping is supported by means of a gas movement in the rotating internal chamber on the basis of a wind of the gaseous part of the coolant in the case of rotation.

If the thermal tube 20 ends earlier in the area of the lateral cavity 13, the transport of this coolant $k_1$ into the central cavity 12 can possibly be further supported by exploiting gravity and/or centrifugal force by the fact that the lateral cavity 13 is in the form of a tube widening with reference to its diameter in the direction of the central cavity 12.

The liquid first coolant or condensate $k_1$ is then evaporated in the interior of the rotor. The evaporated coolant is designated by $k_1$. This coolant $k_1$ evaporated by the absorption of heat then flows through the interior of the first thermal tube 20 back into the condenser chamber 20a of the condenser device 18. In this respect, the return flow is driven by a slight overpressure in the central cavity 12, acting as the evaporator, relative to the condenser device, which is caused by the creation of gas in the evaporator and the liquefaction in the condenser device. Evaporated coolant $k_1$ also fills the space between the tube-shaped rotor shaft part 5b and the mounting tube 24 up to the sealing device 21.

In the superconductive device according to the invention, therefore, the first thermal tube is statically coupled to a refrigeration machine. This provides a transfer of the coolant into the cryogenic area, where the transition between fixed and rotating parts is effected by means of dripping liquid and the return path by means of flowing gas.

According to the invention, at least two different coolants $k_2$ and $k_1$ with a different boiling or condensation temperature ($T_k$) should be provided for the purposes of the cooling and the precooling during the operating phase. In this respect, the coolant designated as the further coolant $k_2$ should display a second condensation temperature $Tk_2$ which in general lies above the operating temperature provided for continuous operation of the superconductive winding. Nitrogen (condensation temperature 77.4 K at normal pressure, triple point at 65 K, critical point at 125 K and 22 bar) or argon (condensation temperature 87.3 K at normal pressure, triple point at 85 K, critical point at 145 K and 38 bar), for example, can be considered for this further coolant $k_2$ depending on the operating temperature. On the other hand, the first coolant $k_1$ should possess a lower condensation temperature ($T_{k1}$) by comparison. This temperature can be chosen such that the operating temperature of the superconductive winding lies only slightly higher, for example up to 20 K, than this condensation temperature. Therefore, hydrogen (condensation temperature 20.4 K at normal pressure, triple point at 14 K, critical point at 30 K and 8 bar) or neon (condensation temperature 27.1 K at normal pressure, triple point at 25 K, critical point at 42 K and 20 bar) can preferably be used as the first coolant $k_1$. Corresponding examples of coolant pairs $k_1/k_2$ comprise neon ($T_{k1}$ of 27.1 K)/argon ($T_{k2}$ of 87.3 K) or the coolant pair neon/nitrogen ($T_{k2}$ of $N_2$:77.4 K) or hydrogen ($T_{k1}$ of 20.4 K)/nitrogen as the coolant pair if an operating temperature is to be provided which lies below $T_{k2}$ and amounts to around 25 K, for example. At this operating temperature, therefore, at least one further coolant $k_2$ remains frozen or where relevant also liquid in the thermal tube 19.

For a cooling operation during a cooling phase, use is made of the further thermal tube 19 which is also coupled statically to the refrigeration machine 15. This cooling operation is described in further detail in the following.

Since at least two coolants with different condensation temperatures are provided according to the invention, in the case of a gradual cooling of the refrigeration head, at least one further coolant $k_2$ with the highest condensation temperature (here: $T_{k2}$) will initially condense and be drawn to the parts of the rotor to be cooled for the purposes of thermal transfer as in the case of the first coolant in a closed thermosyphon circuit.

Following corresponding precooling of these parts down to approximately the triple point temperature of this further coolant, said coolant will then freeze in the area of the condenser device, upon which said device is cooled down to the condensation temperature of the next (first) coolant. In this way, given a suitable choice of coolants, almost continuous cooling can be implemented in the presence of optimum exploitation of the refrigeration power of the refrigeration head.

Naturally, corresponding stage-by-stage precooling with a plurality of (further) thermal tubes in the form of cooling fingers, which are provided with fillings of different (further) coolants, which differ in terms of their condensation temperatures, is also possible.

It was assumed in the case of the superconductive device 2 explained in the foregoing that at least one refrigeration unit 15 possesses a single-stage refrigeration head 16. This means that only one stage is provided or exploited for making the refrigeration power available. It is self-evident, however, that refrigeration heads realized in a multi-stage manner whose stages lie at different temperature levels are also equally well suited. Thus, for example, in the case of a corresponding two-stage refrigeration head, the second (warmer) stage can be connected to the condenser chamber 19a of the further (second) thermal tube 19 for the second coolant $k_2$, while the condenser chamber 20a of the first thermal tube 20 for the first coolant $k_1$ can be thermally coupled to the first stage held at a lower temperature by comparison. Effective precooling is possible by this means.

Where relevant, a power supply or a radiation shield can also be cooled by means of the second (warmer) stage of such a two-stage refrigeration head.

In the case of the superconductive device 2, its winding body 9 can be implemented in a sufficiently thermally conducting manner; i.e. it then displays highly thermally conducting parts between its wall to the central cavity 12 and the winding 10. By this means, the winding is thermally coupled to the cold surface 17 of the refrigeration head 16 of the refrigeration unit 15 in a simple manner by way of the winding body 9, the coolant $k_1$ and $k_1'$ and the condenser chamber 20a of the condenser device 18. For the purposes of improving the heat transfer, measures enlarging the heat exchanging surfaces with reference to the coolant $k_1$, $k_1'$, for example ribbing in the peripheral direction on the winding support wall of the central cavity 12, can be provided where relevant.

Naturally, the parts/containers enclosing the coolants $k_1$ and $k_2$ must be protected against the introduction of heat. A vacuum environment is expediently provided for the purposes of their thermal insulation, therefore, where insulants such as super-insulation or insulating foam, for example, can be provided additionally in the corresponding vacuum chambers where relevant. In FIG. 1, the vacuum enclosed by the vacuum vessel 7 is designated by V. It additionally surrounds the mounting tube 24 enclosing the lateral cavity 13 and extending up to the seal 21. The vacuum enclosing the thermal tubes 19 and 20 and also the condenser chambers 19a and 20a of the condenser device 18 and at least the cold surface 17 of the refrigeration head 16 is designated by V'. Moreover, underpressure can also be generated where relevant in the chamber 22 surrounding the rotor 5 and enclosed by the outer housing 3.

Figure 3:
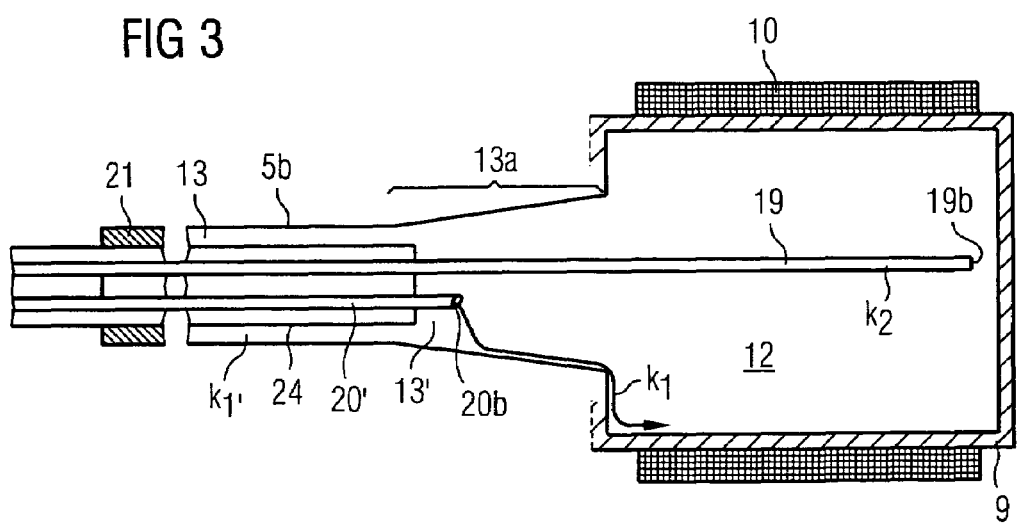
FIG. 3 an extract from a further superconductive device in accordance with the invention.

FIG. 3 shows a special configuration of a superconductive device 2' with a refrigeration unit 15 (not shown) in the area of the transition from a lateral cavity 13' into a central cavity 12. In this respect, the lateral cavity, by way of a divergence from the embodiment shown in FIG. 2, is implemented so that it widens in conical fashion in the direction of the central cavity 12 in an area 13a. The mounting tube 24, from which two thermal tubes 20' and 19 for a first coolant $k_1$ and a further coolant $k_2$ project, ends in this widening area. The tube 19 representing a further thermal tube ends, in line with FIG. 2, in the area of the central cavity 12. On the other hand, the tube to be seen as a first thermal tube 20' has its open end 20b in the widening area 13a. The first coolant $k_1$ emerges from this open end in liquid form. Evaporated first coolant $k_1$ is fed by way of this thermal tube 20', in a manner corresponding to FIG. 2, to a condenser device for recondensation.

In the case of the embodiment of a superconductive device 2 or 2' with rotor 5 shown in the diagrams, a once-only filling with the coolants is provided. Insofar as the refrigeration unit is switched off and the cold parts warm up, the pressure in the tube or cavity system will rise by means of evaporation of the coolant. In this respect, the final pressure is dependent on the enclosed volumes and the quantity of the respective coolant in the system. If neon at around 1 bar and 27 K and minimum liquid quantity is used as the first coolant, for example, it can be assumed that following warming up to ambient temperature of around 300 K, the pressure will lie at more than 12 bar. Since this pressure places a load on the rotating seal 21, it can be advantageous where relevant to provide an external warm buffer volume. Insofar as this volume amounts to n-times the cold volume of the coolant $k_1$, $k_1'$, the pressure rise in the warm state can be reduced to 1:(n+1)-times by this means.

The invention claimed is:

1. A superconductive electric generating device, comprising:
   a rotor adapted to rotate about an axis of rotation;
   a superconductive winding having a plurality of conductors arranged in a winding support;
   a refrigeration unit having a refrigeration head fixedly arranged outside the rotor and thermally coupled to the superconductive winding;
   a central cavity operatively associated with the winding support extending in the direction of the axis and is connected to a lateral cavity leading laterally out of a winding support area;
   a cold surface thermally connected to the refrigeration head and to a condenser to condense a first and a second coolant in separate condenser chambers, the first and second coolants having differing condensation temperatures; and
   a first fixed thermal tube adapted to transfer the first coolant and a second fixed thermal tube adapted to transfer the second coolant, the first and second tubes extending from the condenser into a rotating lateral cavity and into an area within which the following occurs:
      the central cavity, the first fixed thermal tube, and the lateral cavity are filled with the first coolant by a thermosyphon effect,
      the condensed first coolant passes into the central cavity and also the first coolant is warmed and passes back to its condenser chamber via the first thermal tube by the process of evaporation wherein,
   the second fixed thermal tube is sized and configured as a cooling finger that is closed at an end located toward the central cavity and filled with the second coolant via the thermosyphon effect that is condensed in the condenser chamber of the second fixed thermal tube and is warmed by evaporation near the central cavity and passes back to the condenser chamber.

2. The device in accordance with claim 1, wherein a plurality of thermal tubes in the form of cooling fingers filled with coolants having different condensation temperatures are provided.

3. The device in accordance with claim 1, wherein the central cavity is closed by the winding support on one side and the lateral cavity is sealed by a sealing device with co-rotating parts on the side facing the refrigeration head.

4. The device in accordance with claim 3, wherein the sealing device is selected from the group consisting of: a ferrofluid seal, a labyrinth seal, or a diaphragm gland.

5. The device in accordance with claim 1, wherein the refrigeration unit comprising the refrigeration head further comprises a regenerative cryocooler.

6. The device in accordance with claim 5, wherein the cryocooler comprises a pulse tube cooler, a split Stirling cooler, or a Gifford-McMahon cooler.

7. The device in accordance with claim 1, wherein there is a multistage realization of the refrigeration head.

8. The device in accordance with claim 2, wherein the refrigeration head displays two refrigeration stages and the second stage is thermally connected to a power supply or a radiation shield and the first stage is cooler than the second stage and is thermally connected to the condenser chambers of the thermal tubes.

9. The device in accordance with claim 7, wherein the refrigeration head displays two refrigeration stages and the second stage is thermally connected to the condenser chamber of the further second thermal tube and the first stage is cooler than the second stage and is thermally connected to the condenser chamber of the first thermal tube.

10. The device in accordance with claim 1, wherein the superconductive winding operates at a temperature below 77 K.

11. The device in accordance with claim 1, wherein the conductors of the winding contain low $T_c$ superconductive material or high $T_c$ superconductive material.

12. The device in accordance with claim 1, wherein the first thermal tube is sized and configured as a drip rim towards an open end and projects towards the lateral cavity or into the central cavity.

13. The device in accordance with claim 1, wherein the lateral cavity widens in the direction of the central cavity.

14. The device in accordance with claim 1, wherein the cold parts of the rotor and the thermal tubes are vacuum-insulated.

15. The device in accordance with claim 1, wherein the coolants are neon paired with nitrogen, neon paired with argon, or hydrogen paired with nitrogen.

16. A superconducting device, comprising:

a condenser;

a first tube adapted to transfer a first coolant;

a second tube adapted to transfer a second coolant, the first and second tubes extending from the condenser into a lateral cavity located toward the end of the device; and a central cavity located toward the center of the device wherein the second tube is configured as a cooling finger that is closed at an end located toward the central cavity and filled with the second coolant via a thermosyphon effect that is condensed in a condenser chamber of the second tube and is warmed by evaporation near the central cavity and passes back to the condenser chamber.

17. The device as claimed in claim 16, wherein the condensed first coolant passes into the central cavity and is warmed and passes back via the first thermal tube to its condenser chamber by the process of evaporation.

* * * * *